(12) United States Patent
Fossat et al.

(10) Patent No.: US 10,583,638 B2
(45) Date of Patent: Mar. 10, 2020

(54) PANEL MADE OF COMPOSITE MATERIAL HAVING A LAYERED STRUCTURE

(71) Applicant: COMPOSITE RESEARCH S.R.L., Pinerolo (Turin) (IT)

(72) Inventors: Eugenio Fossat, Pinerolo (IT); Nicola Giulietti, Pinerolo (IT)

(73) Assignee: Composite Research S.R.L., Pinerolo (Turin) (IT)

( * ) Notice: Subject to any disclaimer, the term of this patent is extended or adjusted under 35 U.S.C. 154(b) by 0 days.

(21) Appl. No.: 15/545,904

(22) PCT Filed: Jan. 26, 2016

(86) PCT No.: PCT/IB2016/050377
§ 371 (c)(1),
(2) Date: Jul. 24, 2017

(87) PCT Pub. No.: WO2016/120785
PCT Pub. Date: Aug. 4, 2016

(65) Prior Publication Data
US 2018/0015703 A1    Jan. 18, 2018

(30) Foreign Application Priority Data
Jan. 28, 2015 (IT) .............................. TO2015A0061

(51) Int. Cl.
*B32B 27/08* (2006.01)
*B32B 5/04* (2006.01)
(Continued)

(52) U.S. Cl.
CPC ................ *B32B 27/08* (2013.01); *B32B 1/00* (2013.01); *B32B 5/00* (2013.01); *B32B 5/02* (2013.01); *B32B 5/022* (2013.01); *B32B 5/04* (2013.01); *B32B 5/10* (2013.01); *B32B 5/18* (2013.01); *B32B 5/22* (2013.01); *B32B 5/24* (2013.01);
(Continued)

(58) Field of Classification Search
None
See application file for complete search history.

(56) References Cited

U.S. PATENT DOCUMENTS 4,286,006 A    8/1981  Boelter
5,198,282 A    3/1993  Baker et al.
(Continued)

FOREIGN PATENT DOCUMENTS

DE    102007019266 A1    6/2008
EP    1074194 A1         2/2001
(Continued)

OTHER PUBLICATIONS

International Search Report, dated May 23, 2016 (PCT/IB2016/050377).

*Primary Examiner* — Chinessa T. Golden
(74) *Attorney, Agent, or Firm* — Robert L. Stearns; Dickinson Wright, PLLC

(57) ABSTRACT

A panel (1) has a layered structure including: a first outer layer (2), an intermediate layer (3), and a second outer layer (4). The second outer layer (4) has a buckling stress lower than a buckling stress of the first outer layer (2), and the first outer layer (2) and the second outer layer (4) each have a compression failure stress higher than the buckling stress of the second outer layer (4).

14 Claims, 10 Drawing Sheets

(51) Int. Cl.
  B32B 5/18     (2006.01)
  B32B 7/02     (2019.01)
  B32B 27/34    (2006.01)
  B32B 27/36    (2006.01)
  B32B 27/38    (2006.01)
  B32B 27/40    (2006.01)
  B32B 19/04    (2006.01)
  B32B 27/32    (2006.01)
  B32B 5/24     (2006.01)
  B32B 7/00     (2019.01)
  B32B 5/02     (2006.01)
  B32B 5/00     (2006.01)
  B32B 19/00    (2006.01)
  B32B 5/26     (2006.01)
  B32B 7/04     (2019.01)
  B32B 27/00    (2006.01)
  B32B 27/06    (2006.01)
  B32B 9/00     (2006.01)
  B32B 27/12    (2006.01)
  B32B 5/22     (2006.01)
  B32B 5/10     (2006.01)
  B32B 7/12     (2006.01)
  B32B 7/10     (2006.01)
  B32B 19/02    (2006.01)
  B32B 1/00     (2006.01)

(52) U.S. Cl.
  CPC ............... *B32B 5/26* (2013.01); *B32B 7/00* (2013.01); *B32B 7/02* (2013.01); *B32B 7/04* (2013.01); *B32B 7/10* (2013.01); *B32B 7/12* (2013.01); *B32B 9/00* (2013.01); *B32B 19/00* (2013.01); *B32B 19/02* (2013.01); *B32B 19/04* (2013.01); *B32B 27/00* (2013.01); *B32B 27/06* (2013.01); *B32B 27/12* (2013.01); *B32B 27/32* (2013.01); *B32B 27/34* (2013.01); *B32B 27/36* (2013.01); *B32B 27/38* (2013.01); *B32B 27/40* (2013.01); *B32B 2250/40* (2013.01); *B32B 2260/00* (2013.01); *B32B 2260/021* (2013.01); *B32B 2260/023* (2013.01); *B32B 2262/00* (2013.01); *B32B 2262/0253* (2013.01); *B32B 2262/0276* (2013.01); *B32B 2262/101* (2013.01); *B32B 2262/106* (2013.01); *B32B 2305/022* (2013.01); *B32B 2305/024* (2013.01); *B32B 2305/07* (2013.01); *B32B 2305/08* (2013.01); *B32B 2307/546* (2013.01); *B32B 2419/00* (2013.01); *B32B 2607/00* (2013.01)

(56) References Cited

U.S. PATENT DOCUMENTS

| | | | |
|---|---|---|---|
| 5,902,755 A * | 5/1999 | Driggett | C04B 26/08 442/172 |
| 2002/0151240 A1 | 10/2002 | Smith et al. | |
| 2003/0161989 A1* | 8/2003 | Funakoshi | B29C 44/12 428/71 |
| 2009/0019685 A1 | 1/2009 | Keith et al. | |
| 2011/0162777 A1* | 7/2011 | Youn | B32B 27/12 156/62.2 |
| 2014/0323004 A1* | 10/2014 | Mihara | B60R 13/02 442/311 |

FOREIGN PATENT DOCUMENTS

| | | |
|---|---|---|
| EP | 2730396 A1 | 5/2014 |
| JP | H044143 A | 1/1992 |
| JP | H08276525 A | 10/1996 |

* cited by examiner

FIG. 5
A.
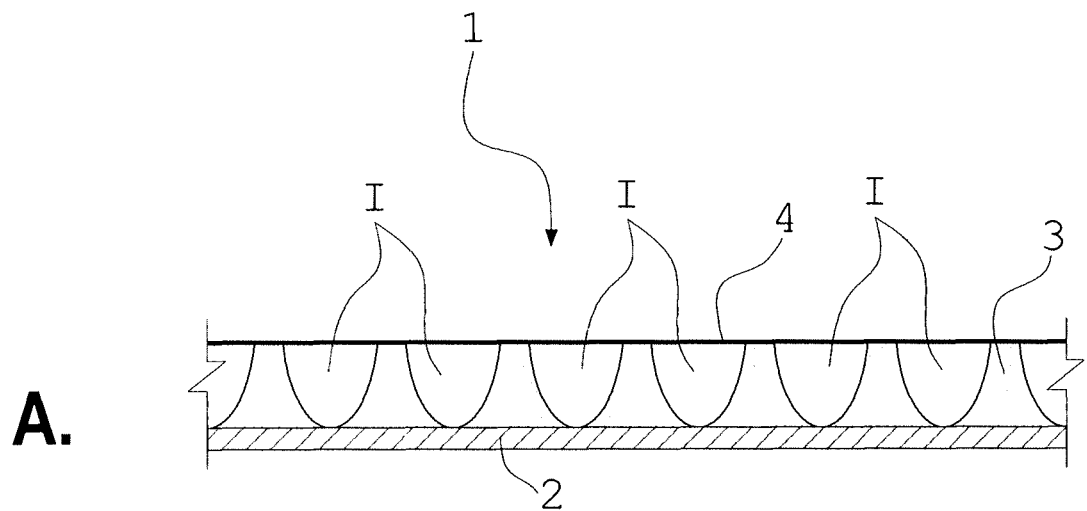
B.
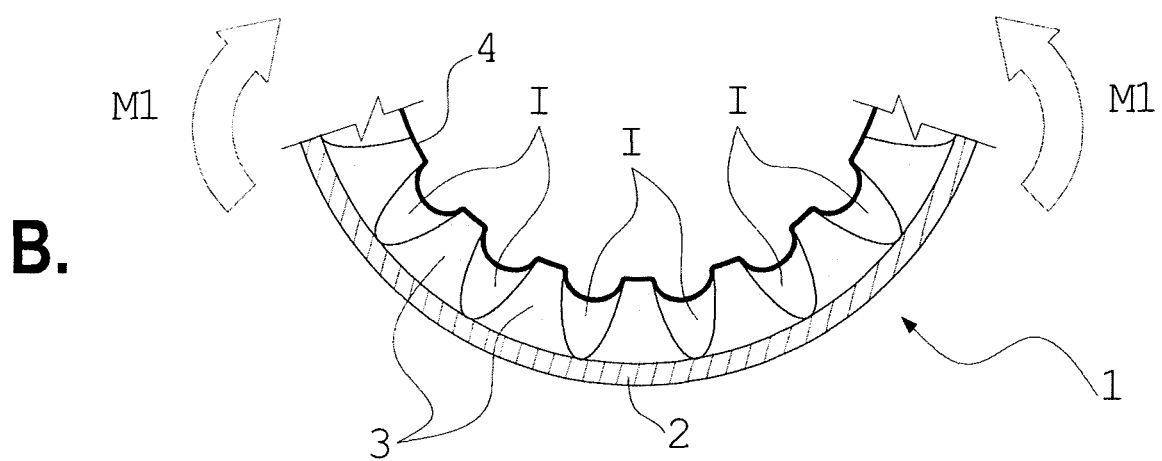

FIG. 6
A.
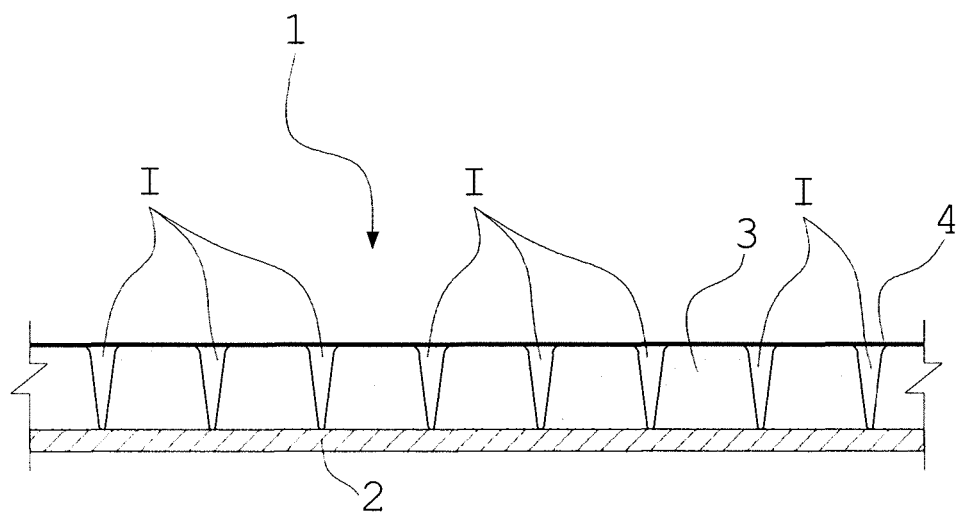
B.
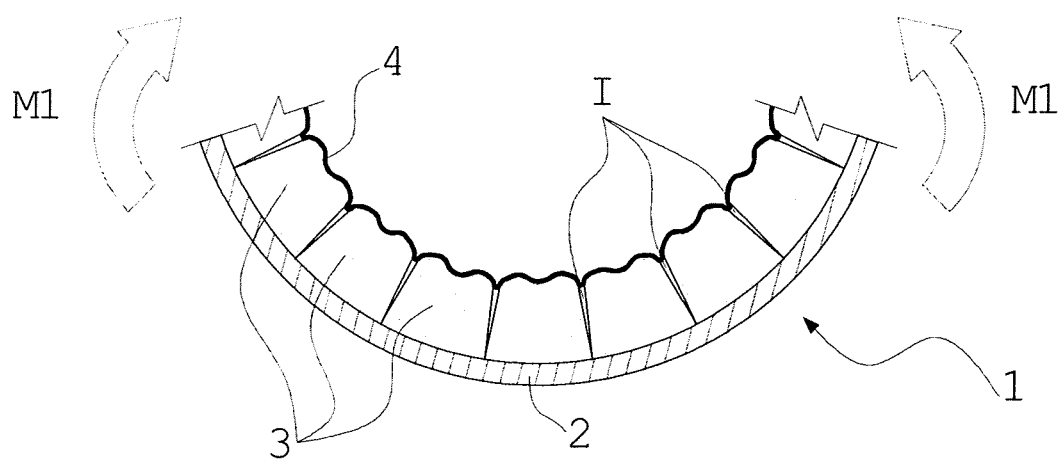

FIG. 7
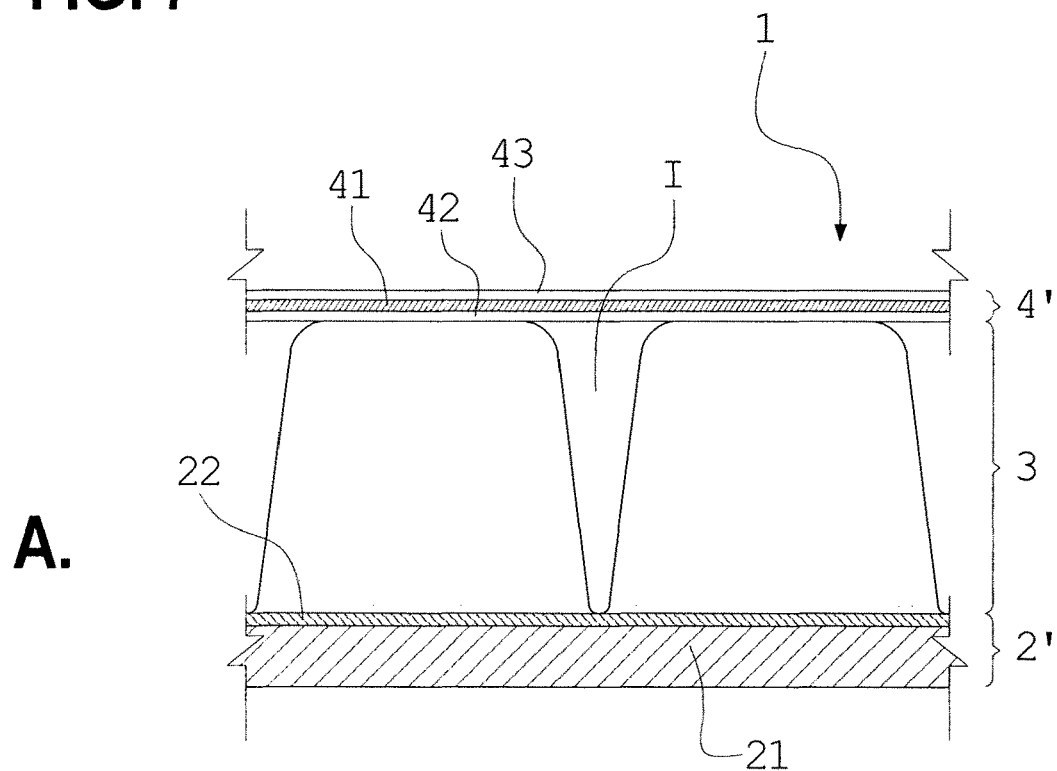
A.
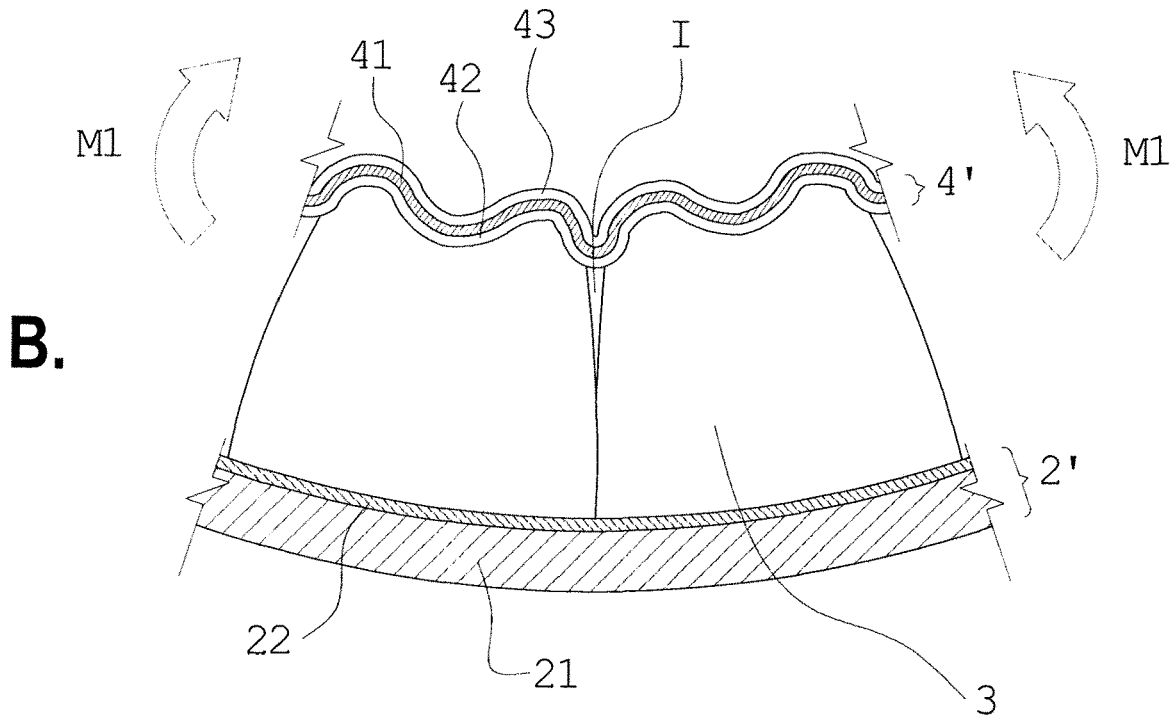
B.

PANEL MADE OF COMPOSITE MATERIAL HAVING A LAYERED STRUCTURE

BACKGROUND

1. Technical Field

The present invention relates, in general, to the field of composite material panels having a layered structure, particularly a sandwich-like structure.

In particular, the present invention relates to panels which are asymmetrical from the bending stiffness standpoint, that is panels that exhibit a different capability of resisting to a bending moment depending on the side of the panel on which said bending moment tends to bend the panel.

2. Related Art

Composite material panels are known having a layered structure, and in particular having a so-called sandwich structure, that is comprising two outer layers, also known as skins or faces, spaced apart and connected by means of an intermediate layer, also known as core.

Generally, the faces of said panels are made of "noble" materials and are configured for distributing the loads across the plane. The intermediate layer, which has in general a higher thickness and is made of lighter material with respect to the faces, has the aim of increasing the overall bending stiffness of the panel with a reduced increase in weight of the same.

Panels of this type thus have a static behaviour remarkably better than that of the single layers they are made of. The Applicant has however observed that, in the panels having a sandwich structure of the known type, when a bending moment is applied which exceeds a certain critical threshold, the face of the sandwich which is subject to compression may undergo a failure for columnar load instability (generally known as buckling) and/or possibly the separation of the face from the core.

Among the panels having a layered structure, panels are known having the feature of being asymmetric from the bending stiffness standpoint, that is panels having a different capability of resisting to the action of bending moments as a function of the fact that such moments tend to bend the panels on one side or the other of the panel.

In particular panels are known that are capable of bending, within their operational ranges and within certain values of bending moments, exclusively on one of their sides.

An example of a panel having a layered structure and having this feature is described in document U.S. Pat. No. 4,286,006. The panel described therein, used in the packaging field, is made of a first outer layer, for example paper, of the type conventionally used for corrugated packaging, a corrugated intermediate layer and a second outer layer, for example in high density polyethylene, having a high resistance to traction, but low resistance to compression. The resulting panel is thus capable of bending on a sole outer layer, particularly on the second outer layer.

The Applicant has however noted that the panel described therein may bend only along a direction which is parallel to peaks and troughs of the corrugated layers, while it remains substantially stiff if an attempt is made to bend it along a direction perpendicular to said peaks and troughs.

A further example of panel having a layered structure which is asymmetrical from the bending stiffness standpoint is described in document EP 1 074 194. Such panel, used for making shoe soles, is made of a first flexible outer layer, but substantially non extensible, for example in fiberglass, an intermediate layer made of a series of non-compressible blocks, for example solid foam, arranged transversally with respect to the panel, and a second elastic outer layer. The panel is thus capable of bending, thanks to a mutual departure of the blocks that make the intermediate layer and thanks to the different mechanical properties of the two outer layers, solely towards the first outer layer.

The Applicant has however noted that the panel described therein exhibits non optimal traction resistance properties, in so far as the second outer layer, which is elastic, does not provide sufficient resistance to traction forces applied longitudinally to the panel.

SUMMARY

The object of the present invention is that of solving the technical problems highlighted above.

According to the present invention, the object is achieved by means of a composite material panel, in particular a material having a layered structure of the sandwich type.

In particular, the object of the invention is achieved by a panel having a layered structure and comprising:
 a first outer layer,
 an intermediate layer, and
 a second outer layer;
 the panel being characterized in that:
 the second outer layer has a buckling stress which is lower than a buckling stress of the first outer layer, and
 in that the first outer layer and the second outer layer each have a compression failure stress higher than the buckling stress of the second outer layer.

The present invention also concerns a method for manufacturing the aforementioned composite material panel.

The claims form an integral part of the technical disclosure herein provided in relation to the invention.

In accordance with the preferred embodiment, the panel comprises a first and a second outer layer and an intermediate layer.

The outer layers are made of fiber-reinforced material with polymer matrix, while the intermediate layer is a filler having a honeycomb structure, made of polymer fibers, and is capable of bending and compressing.

In accordance with a further embodiment, the intermediate layer is a filler made of solid foam, the latter being capable of flexing and compressing.

In accordance to a further feature of the present invention, the two outer layers are both resistant to traction. The first outer layer, preferably comprising carbon fibers, resists compression without appreciably deforming, while the second outer layer, preferably comprising Ultra High Molecular Weight Polyethylene (UHMWPE) fibers, undergoes instability for low compression stresses and markedly deforms, without undergoing damage, thanks to the reduced thickness thereof.

Owing to such properties, the panel exhibits an asymmetric behavior on the bending stiffness standpoint, being capable of bending on the second outer layer, but resulting substantially stiff if subject to a bending moment that tends to bend it towards the first outer layer.

In other words, the panel according to the invention exhibits an asymmetric bending stiffness as a function of the bending direction. In a first bending direction the panel bent with respect to the resting condition corresponds to a configuration wherein the outer fibers of one of the outer layers are subject to an action that considered per se (that is, independently of other actions possibly superimposed that may act on said fibers, including a pre-forming of the material that preliminarily sets traction or compression deformation patterns) brings about a traction of the outer fibers themselves, while the outer fibers of the other outer layer are subject to an action that, considered per se (see above) brings about a compression of the outer fibers themselves (the wording "outer fibers" is herein used by borrowing it from the jargon of construction science, and does not point to the structure of the material of which the layers are made).

In a second bending direction the panel bent with respect to the resting condition corresponds to a mirror-image situation with respect to the above, that is the outer fibers of the first layer are subject to an action that, considered per se (see above), brings about a compression of the outer fibers themselves, while the outer fibers of the second layer are subject to an action that, considered per se (see above), brings about a tension of the outer fibers themselves. However, the bending moments being equal, in the second bending direction the extent of the deformation associated to compression and traction of the outer fibers of the outer layer is much lower than the extent of the same phenomenon that is witnessed in the first bending direction.

BRIEF DESCRIPTION OF THE DRAWINGS

These and other features and advantages of the present invention will result clear from the following description of preferred embodiments, provided purely for exemplary and non limiting purposes together with the help of the attached figures, wherein elements referred to with a same or similar heading indicate elements that have the same or similar functionality and construction and wherein:

FIG. 5 includes a first portion associated to letter A which shows an embodiment of the panel according to the invention in an undeformed condition, and the second portion B that shows the same embodiment of the panel according to the invention in a deformed condition;

FIG. 6 includes a first portion associated to letter A that shows a further embodiment of the panel according to the invention in an undeformed condition, and the second portion B that shows the same embodiment of the panel according to the invention in a deformed condition;

FIG. 7 includes a first portion associated to letter A that shows yet a further embodiment of the panel according to the invention in an undeformed condition, and the second portion B that shows the same embodiment of the panel according to the invention in a deformed condition;

DETAILED DESCRIPTION

Figure 1:
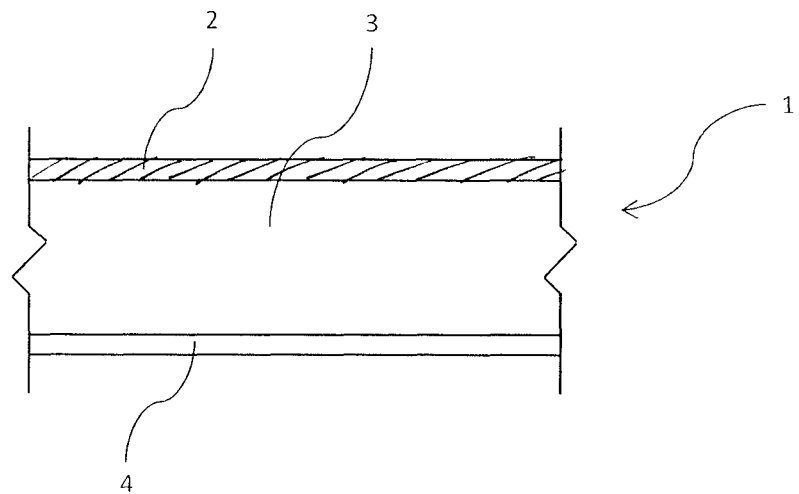
FIG. 1 depicts a cross section of an embodiment of a panel according to the present invention, in resting conditions.

With reference to FIG. 1, reference number 1 designates as a whole a composite material panel having a layered structure of the sandwich type and comprising a first outer layer 2, an intermediate layer 3 and a second outer layer 4. Such layers are joined to each other, at least partially. The panel 1 of FIG. 1 has a structure that in the schematic representation set forth herein is descriptive of various embodiments of the invention.

The outer layers 2, 4 are commonly known with the name of "skins" or "faces", while the intermediate layer is commonly known with the name of "core".

The outer layers 2, 4 are made, preferably, in fiber reinforced polymeric matrix materials (known as Fiber Reinforced Polymers, FRP), that is, composite materials consisting of a polymer matrix wherein fibers 2a, 4a with high mechanical properties are sunk.

Alternatively, subject to the second outer layer 4 being made of fiber reinforced material, the layer 2 may be made of one of the following materials:
- metals: iron, aluminium, titanium, magnesium or alloys thereof,
- polymer materials: preferably polyethylene (PE), polyethylene terephthalate (PET), Nylon (Nylon 6, Nylon 6.6), polycarbonate (PC), Polyetheretherketone (PEEK), polymethyl methacrylate (PMMA), polyoxymethylene (POM), polystyrene (PS), polyurethane (PU), polyvinylchloride (PVC), acrylonitrile-butandiene-styrene (ABS), epoxy resin, phenolic resins, or polyester resins.

In case of layers 2, 4 made of fiber reinforced materials with polymeric matrix, more preferably the first outer layer 2 is made with carbon fibers embedded in an epoxy matrix and the second outer layer 4 is made of polyethylene (PE) fibers embedded in a polyethylene terephthalate (PET).

The epoxy matrix of the first outer layer 2 is, more preferably, a modified epoxy matrix, that is a matrix to which addictives are added, for example polymerization enhancers.

The polyethylene fibers of the second outer layer 4 are, more preferably, polyethylene fibers with high density and a degree of crystallinity higher than 80% (commonly known as High Density Polyethylene, HDPE). Even more preferably, the fibers of the second outer layer 4 are Ultra High Molecular Weight Polyethylene (UHMWPE) fibers, commercially known under the name of Dyneema. The material consisting of Ultra High Molecular Weight Polyethylene fibers embedded in a polyethylene terephthalate (PET) matrix is commercially known as CTF3. Such a material is known for fatigue resistance properties, particularly with respect to bending and recovering of the initial shape cycles, without significant deterioration of the mechanical properties thereof.

The first outer layer 2 has preferably a higher thickness than the second outer layer 4. Preferably the first outer layer 2 has a thickness comprised—endpoints included—between 40 μm and 6000 μm, more preferably comprised between 80 μm and 1000 μm even more preferably equal to 200 μm. In other embodiments, the first layer 2 has a thickness comprised—endpoints included—between 80 μm and 6000 μm, more preferably comprised between 100 μm and 1000 μm. The second outer layer 4 has instead a thickness preferably comprised between 10 μm and 1000 μm more preferably comprised between 40 μm and 600 μm, even more preferably equal to 60 μm. In other embodiments, the second layer 4 has a thickness comprised between 40 μm and 300 μm.

The higher thickness of the first outer layer 5, in combination with the choice of materials, results in a higher stiffness of the second outer layer 2, substantially non compressible, with respect to the second outer layer 4, which instead turns out to be capable of deforming without undergoing failure (for the aforementioned buckling phenomena) if subject to compression.

In order to limit the bending deformation of the panel when the latter is subject to a bending moment M2, the second outer layer 4 is reinforced by means of continuous fibers having an elastic tensile modulus higher than 10 GPa, preferably higher than 20 GPa, even more preferably higher than 40 GPa. The elastic tensile modulus is measured in accordance ASTM C1557 standard at 20° C. temperature, atmospheric pressure and relative humidity of 25%; such measure conditions are common to all the measures made in accordance with ASTM standards mentioned in the present description.

Furthermore, at least in one direction of the panel (preferably a direction parallel to the fibers of the layer 4) the product of the elastic compression modulus of the first outer layer 2, and the thickness of the first outer layer 2 is preferably higher than the product between the elastic tensile modulus of the second outer layer 4, and thickness of the second outer layer 4.

The elastic compression modulus is measured, as a function of the material that makes the outer layer 2, according to ASTM D3410/D3410M in case of fiber reinforced materials, or ASTM D695 standard in case of polymer materials, or even ASTM E9 standard in case of metal materials.

The elastic tensile modulus of the two outer layers is measured in accordance with ASTM D3039/D3039M standard in case of fiber reinforced materials, or in accordance with ASTM D638 standard in case of polymer materials, or yet in accordance with ASTM E8/E8M standard in case of metal materials. Preferably, the value of the elastic modulus (both tensile and compression) of the outer layers 2, 4 is higher than 1 GPa, more preferably higher than 10 GPa, and even more preferably higher than 30 GPa.

In some embodiments, the two outer layers 2, 4 have an elastic tensile modulus (or Young modulus) which is similar. In such embodiments, the two outer layers furthermore have elastic compression modulus that result substantially identical to the respective elastic tensile modulus.

Preferably, furthermore, in such embodiments the two outer layers 2, 4 exhibit respective yield strengths (in case of metal materials or polymer materials) or respective tensile strengths (in case of composite materials) which do not differ by more than two orders of magnitude and higher than 20 MPa. Such quantities are measured in accordance with ASTM D3039/D3039M standard in case of composite materials, in accordance with ASTM D638 standard in case of polymer materials, and in accordance with ASTM E8 standard in case of metal materials.

Yet in such embodiments, it is generally valid (approximately), at least in a direction x parallel to the fibers of the layer 4, the following relationship:

$$E_{2,x} \cdot \sigma_{max,4,x} = E_{4,x} \cdot \sigma_{max,2,x}$$

wherein:

$E_{2,x}$ and $E_{4,x}$ are respectively the elastic modulus of the first outer layer 2 and the second outer layer 4 in the aforementioned direction x, $\sigma_{max,2,x}$ and $\sigma_{max,4,x}$ are the yield strengths (metal materials or polymer materials), or the maximum strengths (fiber-reinforced materials) admissible respectively for the first outer layer 2 and the second outer layer 4 without the latter undergoing permanent damages (in the direction x).

In certain embodiments the materials are chosen so that $\sigma_{max,2,x} = \sigma_{max,4,x}$. In other embodiments, when the sandwich is subject to traction the layer 2 has a failure strength higher or equal to that which generates failure of the layer 4.

In accordance with other embodiments, the two outer layers 2, 4 have different elastic tensile modulus.

Figure 4:
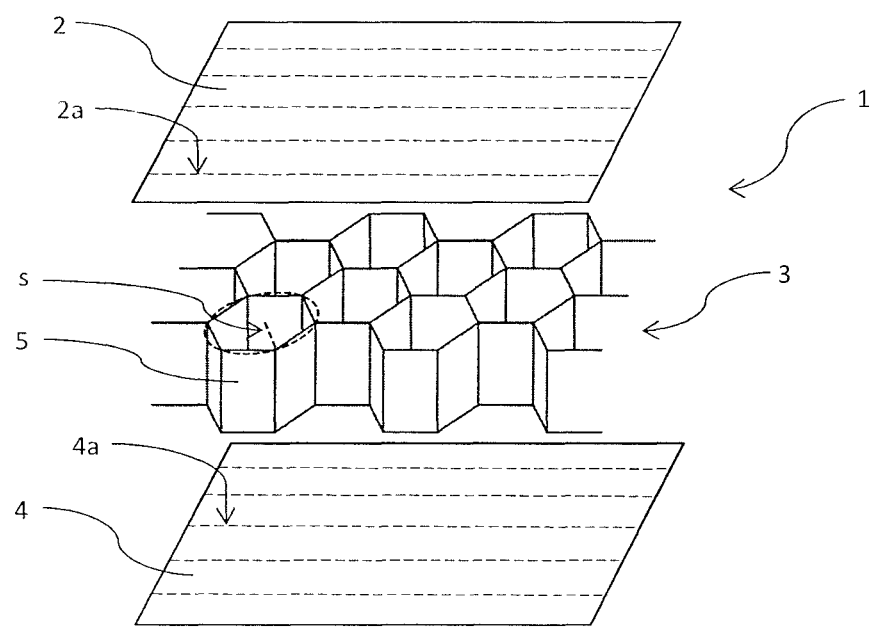
FIG. 4 depicts, in exploded axonometric view, an embodiment of the panel comprising an intermediate layer having a honeycomb structure.

The intermediate layer 3 is a filler made of, preferably, a material having a honeycomb structure made of a plurality of cells set side by side and having the shape of prisms having an hexagonal base; such prisms have faces or walls 5 arranged substantially in a perpendicular direction with respect to the two layers 2, 4 of the panel 1, as shown in FIG. 4. Alternatively, the shape of the cells may differ from the hexagonal one: triangular, circular or quadrangular (rectangular or square) cells may be for example envisaged.

The capabilities to deform of the first outer layer 2 depend furthermore from the polymerization degree of the matrix comprised in said layer. Preferably, such polymerization degree is comprised between 70% and 100%, more preferably between 75% and 95%.

In accordance with a preferred embodiment, shown in FIG. 4, the fibers 2a of the first outer layer 2 and the fibers 4a of the second outer layer 4 are arranged in a same direction, so as to guaranty the maximum tensile resistance in the direction in which the fibers are oriented. In accordance with a further embodiment, the fibers are crossed or constitute a web capable of better resisting to traction in two or more main directions. Preferably, at least one of the directions of the fibers of an outer layer coincides with one of the directions of the fibers of the other outer layer.

The intermediate layer 3 having a honeycomb structure is made, preferably, of polycarbonate or polymer fibers, for example aramidic, polyethylene or carbon fibers, immersed in polymer matrices, such as phenolic or epoxy resins. The intermediate layer 3, according to other embodiments, is a filler made of solid foam, for example polyurethane foam or polyesther foam. Other suitable materials include polystyrene, polyvinylchloride (PVC), polyolefins, foamed urea, carbon, ethylene vinyl acetate, polyethylene terephthalate or polyester or combinations of them. Auxetic foams can also be used.

Preferably, the intermediate layer (whatever the material) has a thickness comprised between 2 mm and 50 mm, more preferably comprised between 5 mm and 20 mm, even more preferably equal to 10 mm Preferably, the thickness of the intermediate layer 3 is at least five times higher than that of the second outer layer 4, more preferably at least ten times higher than that of the outer layer 4.

Furthermore, a single hexagonal cell of the intermediate layer 3 has a dimension s comprised between 1 mm and 15 mm, more preferably comprised between 1.5 mm and 5 mm, even more preferably equal to 2 mm (wherein by dimension S of the hexagonal cell it is meant the radius of a circumference circumscribed to the hexagonal cell).

Since the intermediate layer 3 makes up a relevant portion, in volume, of the panel 1, in order to guarantee a low overall density of the panel 1, it is preferable that the intermediate layer 3 have (from the macroscopic point of view) a density lower than 200 Kg/m3, an more preferably lower than 80 Kg/m3. Such density is commonly known under the name of "bulk density".

In some embodiments, the intermediate layer 3 is made of foam material, which is surface finished or shaped more or less deeply, for example, as visible in FIGS. 5, 6, 7, the intermediate layer 3 may be carved, so as to create more slats of material spaced by gaps I (which each gap I comprised between two subsequent slats). The amplitude of the spaces I may be more (FIG. 5) or less (FIG. 6) wide depending on the needs. In this way the material of the layer 3 is imparted a preferential bending direction. By the term "bending direction" it is meant to indicate the direction of an axis around which the rotation of a first section of material occurs (in this case the intermediate layer) with respect to an adjacent section of material when the first section of material is bent onto the second section of material.

Alternatively, the material of the layer 3 may be carved so as to impart thereto an embossed structure, for example by providing the gaps I along a pair of orthogonal directions with a method akin to dinking. By doing so two preferential bending directions are obtained which are orthogonal to one another.

Example of foam bearing such carvings are commercially known under the names Grid-Scored, CountourKore, Scored, FlexiCut.

Preferably, the gaps I do not extend over the entire thickness of the intermediate layer, and are oriented such that they face toward the layer 4. This means that the intermediate layer 3 exhibits, at the interface with the layer 2, a surface which is free of geometric variations, while it exhibits a surface alternated by valleys (the gaps I) with respect to the layer 2.

The intermediate layer 3, be it a foam or a honeycomb material, has a compression modulus such as to allow the deformation of the panel when the latter is bent on the second outer layer 4.

Particularly, for the intermediate layers 3 considered herein, a distinction can be made between:
- a macroscopic compression modulus, which can be measured by means of regulations ASTM C365/C365M, that characterizes the layers and that is measured in foams at a dimension which is higher than that of the porosity present therein or, in the materials with honeycomb structure, at a dimension which is higher than twice of the dimension s of the hexagonal cells, and
- a compression modulus of the material, that characterize the material of which are made the walls of the porosity of the foams or the walls 5 of the cells of the honeycomb structure.

Generally, the macroscopic compression modulus of the intermediate layer 3, in at least one direction parallel to the layers of the panel—in the following named, for convenience, longitudinal direction—results preferably lower than the compression modulus of the first outer layer 2; more specifically, the macroscopic compression modulus of the intermediate layer 3 is by at least two orders of magnitude lower than the compression modulus of the first outer layer 2 (which in this case is the elastic compression modulus), more preferably at least three orders of magnitudes lower. This allows to avoid that the intermediate layer 3 be of hindrance to the bending of the panel 1 in at least one direction which is substantially perpendicular to such longitudinal direction (s) along which the intermediate layer is compressible.

Furthermore, the walls 5 of the cells of the material with honeycomb structure or the porosities have bending stiffness sufficiently low to allow the bending without bringing about excessive strengths into the material, so as to avoid the damage of the layer 3 in case of bending of the same.

The result is that the bending stiffness of the walls 5 of the cells of the honeycomb material or the porosities increases with the increase of the elastic modulus of the material of which they are made and, in case of honeycomb material, with the increase of the characteristic dimension of the walls 5 of the hexagonal cells.

The intermediate layer 3 with honeycomb structure or shaped foam (for example with gaps I) is provided with preferential bending directions, arranged longitudinally with respect to the layers of the panel 1, corresponding to the direction of the sides of the hexagonal cells. Preferably, one of said preferential directions is made to coincide with at least one direction in which the fibers 2a, 4a inside the outer layers 2, 4 are arranged, as shown in FIG. 4.

The intermediate layer 3 made of non-shaped foam instead turns out to be isotropic and thus free of preferential bending directions.

In case of use of an intermediate layer 3 made of material with honeycomb structure, the buckling of the outer layers corresponds to the phenomenon described as "face dimpling" by ASTM C274 standard, and the capability to deform of the two outer layers 2, 4 is influenced by the dimension s of the hexagonal cells; it is in fact known that, in a first approximation, the following relationship can be applied:

$$\sigma_{b,i,x} = 2 \cdot E_{c,i,x} \cdot (t_i/s)^2$$

wherein:

$\sigma_{b,i,x}$ is the critical buckling stress of the first or, respectively, the second outer layer (i=2,4), in a generic direction x belonging to the bi-dimensional domain that describes the surface development of the layer, preferably (in case of fiber-reinforced material) a direction coincident with the direction of orientation of the fibers;

$E_{c,i,x}$ is the elastic compression modulus of the first or, respectively, the second outer layer (i=2,4), in the same above direction x;

$t_i$ is the thickness of the first or, respectively, the second outer layer (i=2,4), and s is the dimension of the hexagonal cell.

In case of use of an intermediate layer 3 made of foam, the critical buckling stress (critical compression stress), more correctly that which determines the "face wrinkling" phenomenon (with reference to ASTM C274 standard) of the two outer layers 2, 4, is influenced by the elasticity modulus and by the thickness of the layer itself. Various relationships are known for estimating such critical compression stress (indicated as $\sigma_{b,i,x}$) among which the following:

$$\sigma_{b,i,x} = 2/3 \cdot (E_{c,i,x} \cdot E_{3,z} \cdot t_i/t_3)^{0.5}$$

wherein, similarly to the previous relationship:

$t_i$ is the thickness of the outer layer (first or second) considered (i=2,4).

$E_{c,i,x}$ is the compression elasticity module of the same (first or second respectively; i=2, 4) outer layer in accordance with ASTM D3410/D3410M standard (for skin made of fiber-reinforced the polymer matrix), in the direction x of calculation of the stress $\sigma_{b,i,x}$;

$t_3$ is the thickness of the intermediate layer 3, and $E_{3,z}$ is the compression elasticity module of the intermediate layer 3 in the direction of the thickness in accordance with ASTM C365/C365M standard.

Generally, the buckling stress of the second outer layer 4 is, preferably, lower than the compression failure stress of both the outer layers 2, 4, and also lower than the stress that results in the failure of the panel 1 owing to the separation of layers.

Furthermore the buckling stress of the second outer layer 4 is lower than the buckling stress of the first outer layer 2.

Such relationships are valid independently of the material that constitute the layers 2, 4.

The compression failure stress of the second outer layer 4 may turn out to be hardly measurable with precision, however it can be verified whether the latter is lower than the buckling stress of the second outer layer 4 by running a bending tests such as that shown in FIG. 14 and subsequently described in the embodiment 2: if by applying a bending load that produces compression of the outer layer 4 the latter will undergo a non-disruptive buckling phenomenon, the criteria will be satisfied.

Preferably, the buckling stress of the first outer layer 2 is no more than one order of magnitude lower than the compression failure strength thereof.

Furthermore, preferably, the buckling stress of the second outer layer 4 is by at least one order of magnitude lower than the compression failure strength of the panel 1 (wherein by failure it is meant the failure of one of the layers of the panel or the disassembly thereof).

At least in one direction parallel to the fibers of the second outer layer 4, the first outer layer 2 shall preferably, have a buckling stress (or compression failure stress, when the latter is lower than the buckling stress thereof), that multiplied by the thickness of the first outer layer 2, is higher than ⅓ of the product between tensile failure stress (according to ASTM D3039/D3039M standard) of the second outer layer 4 and thickness of the second outer layer 4.

In formulae:

$$\sigma_{b/c,2,x} \cdot t_2 > (1/3) \cdot \sigma_{max,4,x} \cdot t_4$$

wherein $\sigma_{b/c,2}$ is the buckling stress (or compression failure stress, when lower than the buckling stress) of the layer 2, in direction X parallel to the fibers of the layer 4

$t_2$ is thickness of the layer 2

$\sigma_{max,4}$ is the tensile failure stress of the layer 4 in the aforementioned direction X $t_4$ is the thickness of the layer 4

The compression failure stress of the skins constituting the outer layers, that is of the outer layers, is measured in accordance with ASTM D3410/D3410M standard in case of fiber-reinforced material, or in accordance with ASTM D695 standard in case of polymer materials, in accordance with ASTM E9-89A standard in case of metal materials. By the wording compression failure stress it is meant the compression yield strength, where the latter turns out to be lower than the failure stress.

The reference to the wording "layer" as far as the buckling stresses are concerned means to indicate the fact that the layer assembled to form the panel is considered, and not the layer per se before the assembly of the panel.

In order to guarantee the assembly of the panel 1, between the first outer layer 2 and the intermediate layer 3, as well as between the latter and the second outer layer 4, corresponding adhesive films are preferably provided.

Alternatively, it is possible to obtain the assembly between at least one of the two outer layers 2, 4 and the intermediate layer 3 by way of polymerization of the polymer matrix comprised in at least one of the two outer layers 2, 4, respectively.

In the preferred embodiment, between the intermediate layer 3 and the second outer layer 4 an adhesive film is interposed which is made, for example, polyethylene and modified maleic anhydride or modified polyolefines.

In the art of further embodiments, for example those being with the subject of FIG. 7, the outer layer 2 may include two or more layers of materials joined to each other. In particular, in the embodiment of FIG. 7 the first outer layer 2 is covered by a lining layer 22 arranged between the layer 2 and the intermediate layer 3. It is in other words, an embodiment for the layer 2 is lined with an interface layer in correspondence of the joining with the layer 3.

Furthermore, in the same embodiment the second outer layer 4 is lined on both sides with, respectively, a second and a third lining layers 42, 43.

In such embodiments preferably the intermediate layer 3 is made of foam material carved so as to present gaps I.

In order to avoid that the buckling of the second layer 4 damages or disrupts the latter, it is necessary to limit the elasticity modulus of the polymer matrix, which measured in accordance with ASTM D695 standard results comprised between 0.05 GPa and 20 GPa, more preferably comprised between 0.1 GPa and 10 GPa, even more preferably comprised between 0.5 GPa and 5 GPa.

In order to protect the second outer layer 4 from bending failure during buckling, the possible lining layers of the second outer layer 4 shall have elasticity module, in accordance with ASTM D695 standard, lower than the tensile elasticity module of the reinforcement fibers of the second outer layer 4 (measured in accordance with ASTM C1557), preferably at least five times lower, more preferably at least ten times lower, even more preferably at least thirty times lower.

This applies both in case of contemporary presence of the layers 42 and 43, and in case where only one side of the layer 4 is lined (both that at the interface with the layer 3, and that facing outwards).

In case of lining of the layer 4 on both sides (layers 42, 43), a material can be used for lining which is characterized by an elasticity module lower than that of the layer 4, that prevents the formation on the layer 4 of wrinkles having a curvature radius lower than that which would generate the failure of the matrix or the fibers.

The bending properties of the panel 1 are the result of the contemporary presence of the following features:

a capability of the intermediate layer 3 of compressing along a direction parallel to that of the layers, owing to the structure thereof (characterized by porosity, in case of foams, or presence of cells empty or filled with gas, in case of honeycomb structure material) and of the elastic features of the material of which the layer is made, a reduced buckling stress of the second outer layer 4, such as to allow the latter to locally collapse towards the intermediate layer 3 (thus into the hexagonal cells or by compressing the foam in a direction which is orthogonal to that of the surface thereof) and/or outwards of the panel 1, specially where no gluing is provided between the outer layer 4 and the intermediate layer 3.

In order to reduce the buckling stress of the second outer layer 4, it is possible to envisage contact areas between such outer layers and the intermediate layer 3 that are not glued;

this, for example, may be obtained by using shaped adhesive films. The dimension of the non-glued areas will correspond to the typical dimension at which the buckling phenomenon occurs.

A further way to reduce buckling stress of the second outer layer 4 consists in envisaging that a portion of the intermediate layer 3 proximate to the outer layer 4 has a lower macroscopic compression modulus in a direction normal to that of the panel layers. On the contrary, in order to avoid the buckling of the first outer layer 2, it will be envisaged, in a portion of the intermediate layer 3 proximate to the outer layer 2, a higher macroscopic elasticity module.

In accordance with other embodiments, the first outer layer 2 is made of, for example, glass fibers, aramidic fibers (for example, those made of terephthalamide polyparaphenylene, known commercially under the name of Kevlar), polypropylene fibers or polyester fibers. Such fibers are embedded, for example, in epoxy, polyester, polyurethane or polyamide resin matrices.

In accordance, with further embodiments, the second outer layer 4 is made, for example, by polypropylene fibers (PP), Vectran fibers (consisting of 4-hydroxybenzoic acid and 6-hydroxy-naphthalene acid, carboxylic acid), Zylon fibers (p-phenyl-2,6-benzobisoxazole) aramidic fibers (for example those known commercially under the name of Kevlar) or carbon fibers. Such fibers are embedded, for example, in polyamide (PA), polyethylene (PE), polyethylene terephthalate (PET) matrices, or, in the case of use of aramidic fibers, in an epoxy, polyester or polyurethane resin matrix.

The use of the aforementioned fiber-reinforced polymer materials for making the outer layers 2, 4 allows making up a panel with properties similar to those of the preferred embodiment, by suitably choosing parameters such as the thickness of such layers, the polymerization degree of the polymer matrices which are used and the arrangement of the fibers 2a, 4a embedded therein.

The manufacturing method of the panel 1 subject of the present invention envisages the creation of the panel layers by way of suitable extruders and molds. It is possible to make up panels having a determined resting shape by choosing molds of suitable shapes and/or suitable rotational speeds of the extruders. For example, if a hemi-cylindrical mold is used, the panel will keep the hemi-cylindrical shape of the mold as a resting shape.

After making up the layers of the panel, the manufacturing method envisages the stacking and the gluing of said layers.

This preferably occurs in a low pressure environment provided, for example, in an autoclave or by means of vacuum bag technology; more preferably the environment wherein gluing occurs as a pressure lower than 0.4 bar.

Figure 8:
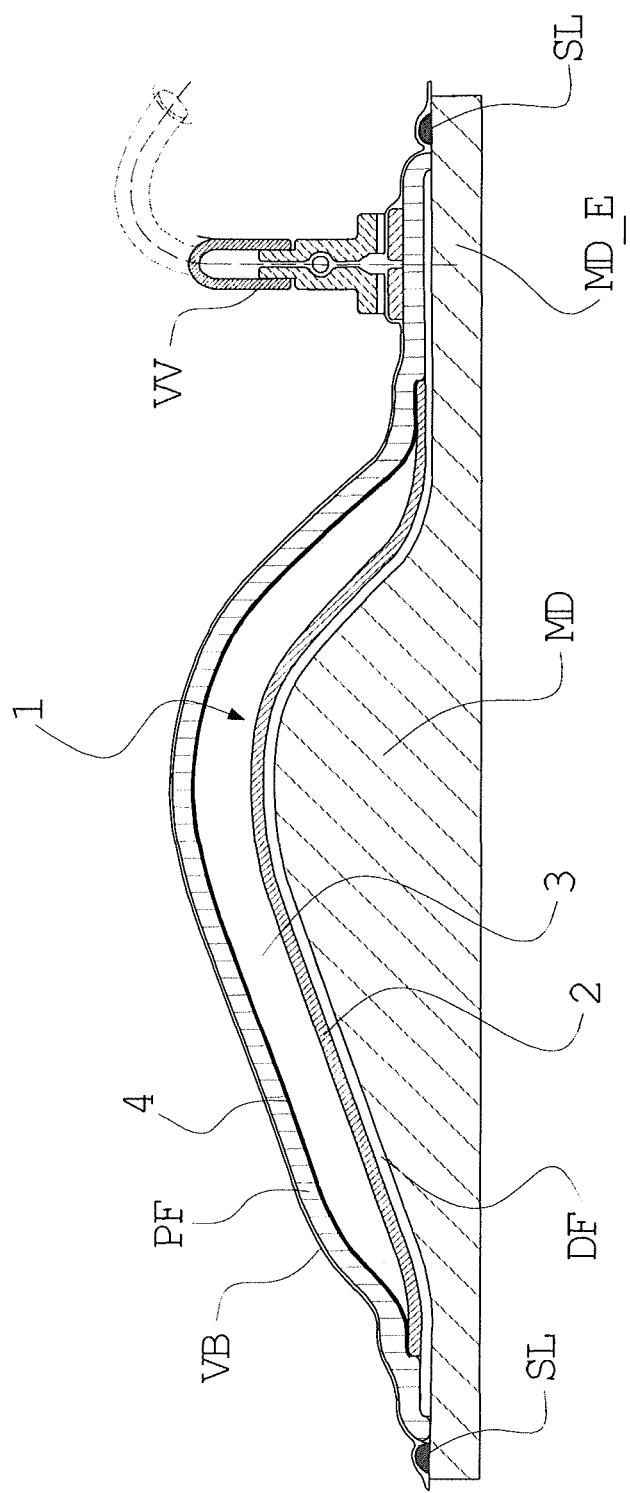
FIG. 8 shows a cross section of an embodiment of the panel according to the invention during a possible manufacturing process.

The forming of the panel 1 by way of vacuum bag is schematically depicted in FIG. 8. More in detail, a mold MD optionally lined by a detaching polymeric film DF (or in alternative a detaching gel) that provides the panel (sandwich) the resting shape (non deformed configuration).

The first outer layer 2 is set on the detaching film DF, the filler/intermediate layer 3 is deformed to adhere to the first outer layer 2, then the second outer layer is positioned on top of the intermediate layer 3 tensioned so as to obtain a wrinkle-free surface.

On top of the layer 4 a detaching film is optionally positioned (not shown in the figure), then a transpiring fabric, and ultimately a vacuum bag VB, that is closed on the edges of the mold MD by means of mastic beads SL.

By means of a valve VL for vacuum bag connected to a vacuum pump, the gases in the chamber comprise between the mold MD and the vacuum bag VB are suctioned so that the air outside of the vacuum bag VB compresses the vacuum bag itself by keeping in close contact with each other the disparate layers of the sandwich during the subsequent curing process.

The gluing in a low pressure environment allows, advantageously, a better adhesion between the layers of the panel 1. Preferably, gluing occurs at a temperature comprised between 40° C. and 200° C., more preferably equal to 120° C. The curing time to obtain gluing is, preferably, comprised between 30 minutes and 6 hours, more preferably equal to 45 minutes.

The curing process with the above described condition determines the gluing between the layers 2, 3, 4 by way of polymerization of the polymeric matrices contained in the outer layers of the panel, or, in case of use of the polymeric adhesives interposed between the layers, by way of polymerization of said films.

Preferably, the outer layers 2, 4 and the possible adhesive films have a surface which is greater than that of the intermediate layer. In such case, the outer layers and the related adhesive film, if present, are folded on edges of the panel (that is the sides of the panel in the direction of thickness), owing to the pressure. Preferably matrices and/or adhesives are chosen that cure at the same temperature conditions and with similar times so as to avoid a degradation of the polymers, and in order to permit the copolymerization on the edges and achieve an effective adhesion of the skins to the core. Advantageously, this provides the panel with a higher resistance to separation of layers.

The inventors have further observed how it is advisable to bend a first time the sandwich towards the thin skin (outer layer 4) at the end of the manufacturing method, so as to improve the flexibility thereof.

The operation of the panel described in the foregoing is the following.

Figure 2:
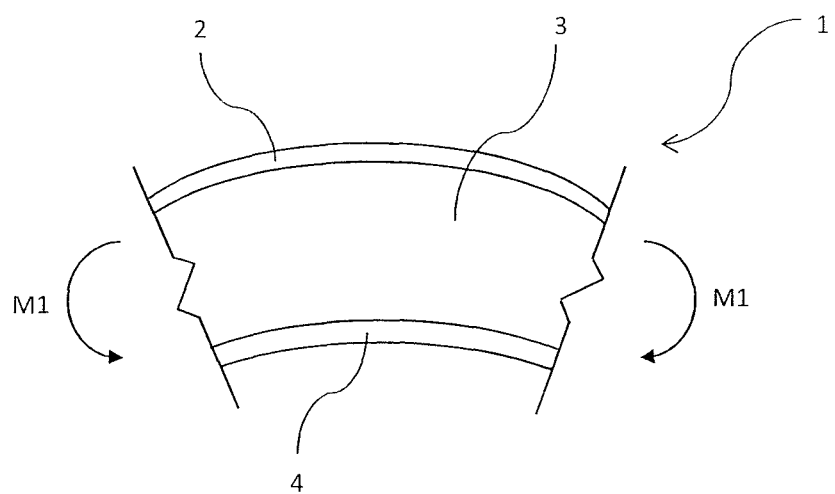
FIG. 2 depicts the panel of FIG. 1 curved towards a second outer layer thereof owing to a bending moment M1, which results in a bent panel with a first bending direction.
Figure 9:
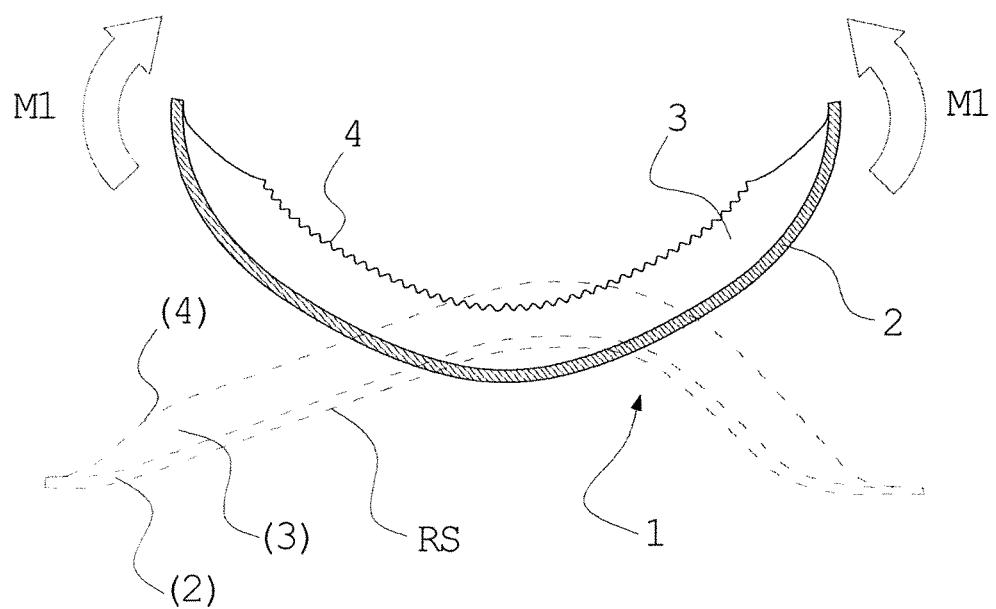
FIG. 9 shows the panel of FIG. 8 subsequent to the forming thereof and subject to a first bending moment.

By applying to the panel 1 in resting conditions a bending moment M1, as shown in FIGS. 2 and 9 (and as far as the embodiments with intermediate layer 3 carved with gaps I are concerned, in FIGS. 5B, 6B, 7B), such as to bend the panel towards the second outer layer 4, a variation in curvature of the panel with respect to the resting condition is brought about (the shape of which is indicated by dashed line and reference RS in FIG. 9), that is the panel 1 bends on the second outer layer 4.

The wording "bending the panel towards the second outer layer 4", as evident from the figure, is meant to indicate a condition whereby the panel 1 is deformed in a first bending direction owing to the bending moment M1 that is characterized by the application/superposition of a traction/tension of the outer fibers of the layer 2 and the compression of the outer fiber of the layer 4.

This is due to the fact that the second outer layer 4 is deformable by buckling and flexible while the first outer layer 2 is flexible but substantially non extensible.

Figure 3:
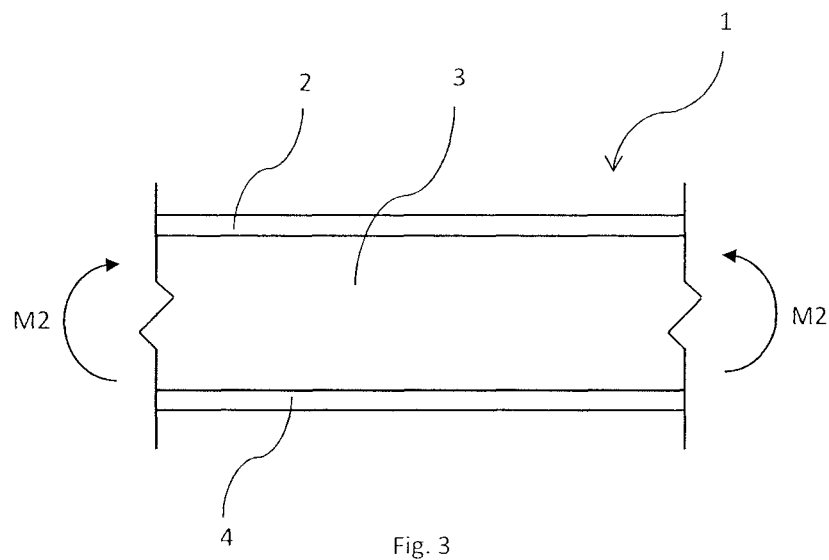
FIG. 3 depicts the panel of FIG. 1 that remains substantially stiff when it is subject to a bending moment M2 that acts so as to bend the latter towards a first outer layer thereof, which results in a bent panel with a second bending direction.
Figure 10:
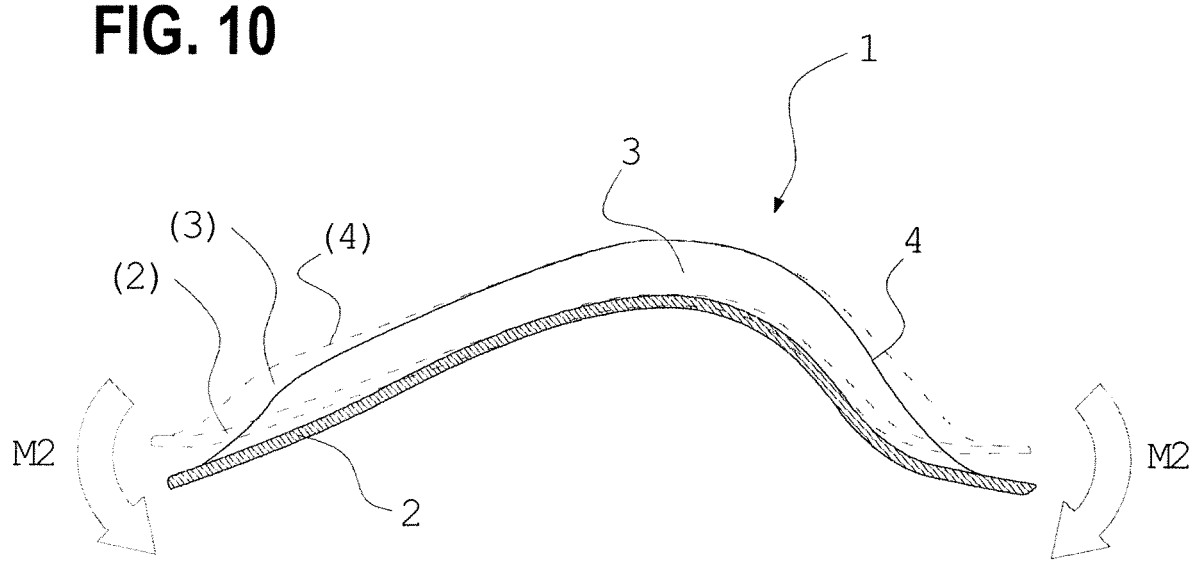
FIG. 10 shows the panel of FIG. 8 subsequent to a forming thereof and subject to a bending moment opposed to the bending moment outlined in FIG. 6.

If, on the contrary, a bending moment M2 is applied to the panel 1 (having the same intensity but opposite direction to M1), as shown in FIG. 3 and FIG. 10, and such as to bend the panel 1 towards the first outer layer 2, the panel 1 does not undergo macroscopic deformations, substantially keeping the resting shape (again reference RS, FIG. 10).

The wording "bending the panel towards the first outer layer 2" as evident from the figures, intends to designate a condition whereby the panel 1 is deformed in a first bending direction due to the bending moment M2 that characterizes itself for the application/superimposition of a traction/tension of the outer fibers of the layer 4 and the compression of the outer fibers of the layer 2, in a mirror like fashion with respect to what occurs under the effect of the moment M1. This is due to the fact that the first outer layer 2 resist to compression without deforming due to buckling and the second outer layer 4 is substantially non extensible. This behaviour is a consequence of the fact that the buckling stress of the layer 2 is higher than that of the layer 4. Thanks to this property, the layer 2 has mainly an elastic or quasi-elastic bending behaviour, while the layer 4 has mainly tensostructural behaviour: the low buckling stress results in reversible elastic instability (so-called "reversible wrinkling") when the layer 4 is subject to compression—such as in case of the action of the bending moment M1—and resistance to pure traction (or nearly pure) when the layer 4 is subject to traction—such as in case of the action of the moment M2.

The bending deformation of the layer 2 is thus allowed in the bending direction associated to a compressive condition of the layer 4, insofar as in such condition the elastic instability of the layer 4 is compliant in respect of the deformation of the layer 2. On the contrary, the tensostructural behaviour of the layer 4 emerges when setting up a traction condition of the same layer, which counteracts the bending deformation of the layer 2 in the opposite bending direction. The man skilled in the art will thus appreciate the analogy with the behaviour of tensostructures proper: the tensostructural element counteract the bending deformation of the suspended masses in one and a single direction (in that case necessitated by the direction of the G-force).

Figure 12:
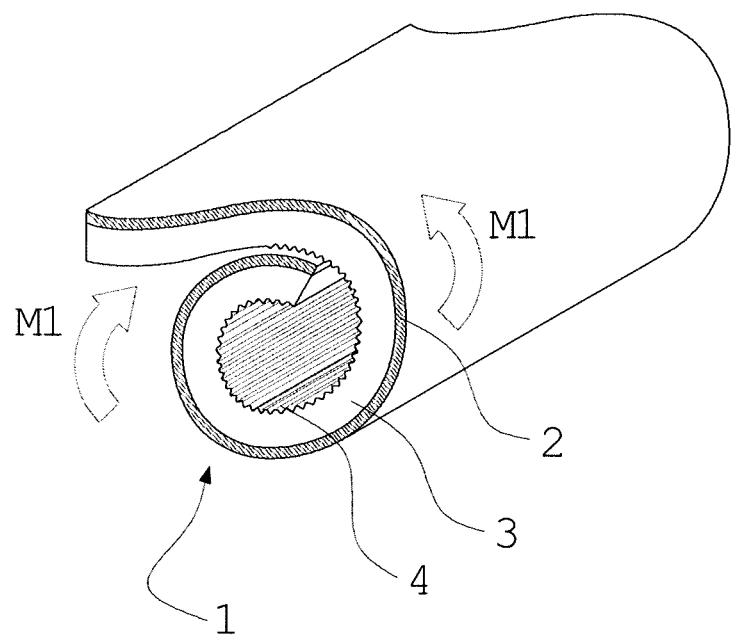
FIG. 12 shows the panel of FIG. 11 in a rolled deformed condition.
Figure 13:
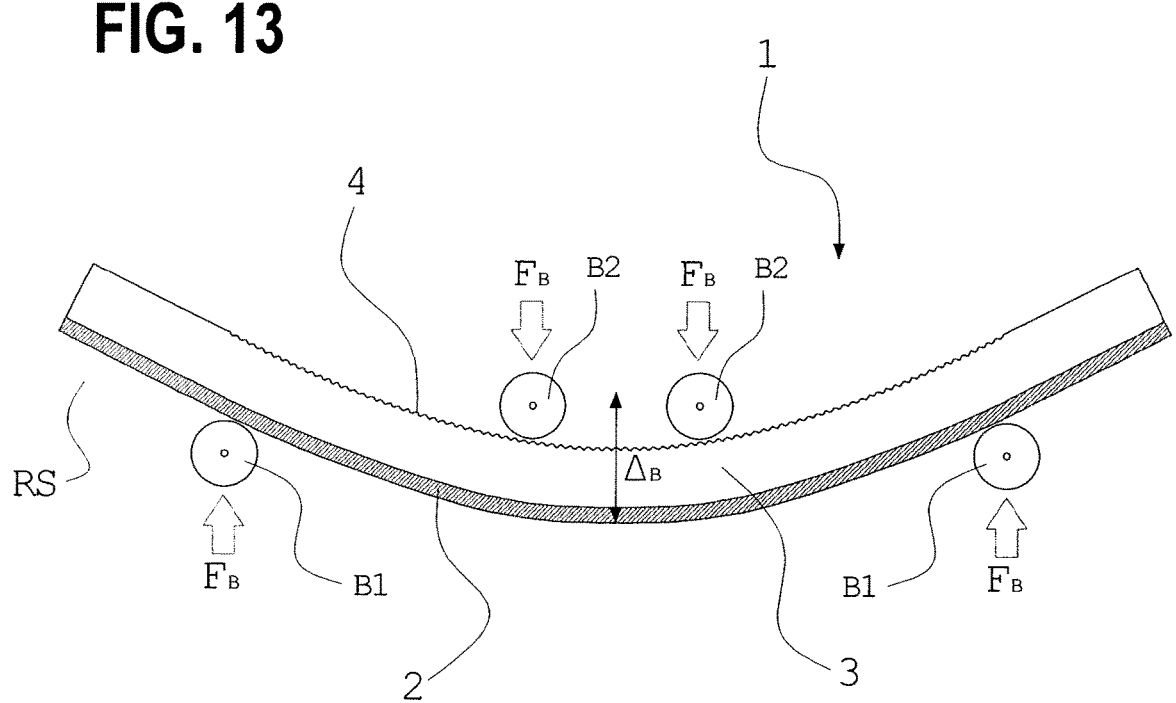
FIG. 13 and FIG. 14 show two testing conditions for a panel in accordance with an embodiment of the invention corresponding to example 2.

In yet other words, it can be said that in the panel/sandwich 1, and in a bending direction that determines the compression of the outer fibers of the outer layer 2, the latter is supported by means of a tensostructure made up of the layer 4, which is strongly limits, to the extent that it prevents it, the bending deformation. In the opposite bending direction, the bending deformation of the layer 2 may be remarkable, even arriving (FIG. 12) to the rolling up of the panel 1 with the layer 4 in conditions of full wrinkling This asymmetry of the bending stiffness thus is obtained by virtue of the choice of the layers of the panel (those according to the technical features described above, such as elastic modulus, buckling stresses, macroscopic compression modulus, etc.), that allow to obtain that the bending stiffness of the panel, when the latter undergoes the action of a bending moment M1 be, preferably, at least by order two magnitudes lower than the stiffness of the same panel with subject to a moment M2 (having equal intensity with respect to the moment M1). More preferably, the stiffness associated to the moment M1 is at least three orders of magnitudes lower than the stiffness associated to the moment M2.

The bending of the panel on the second outer layer 2 occurs furthermore along preferential bending directions, determined by the structure of the panel 1. For example, if the panel 1 comprises an intermediate layer having a honeycomb structure, the panel 1 offers a lower resistance to bending along direction corresponding to symmetry axes (arranged longitudinally with respect to the panel) of the honeycomb structure, corresponding to the direction of the size of the hexagonal cells. Further preferential bending directions are also determined by the orientation of the fibers 2a, 4a in the outer layers 2, 4; for example, if such outer layers comprise fibers arranged in a same direction, the panel 1 offers a lower resistance to bending along the direction parallel to said fibers.

Example 1

A manufacturing example of the panel in accordance with the present invention envisages the provision of the first outer layer with a 0.180 mm thickness and comprising carbon fibers in a modified epoxy matrix, of a second outer layer having a 0.060 mm thickness and comprising Dyneema fibers in a polyethylene terephthalate matrix, and of an intermediate layer with a honeycomb structure made of aramidic fiber in a phenolic matrix having a 10 mm thickness. A polymer film has been furthermore interposed made of polyethylene and modified maleic anhydride between the second outer layer and the intermediate layer.

The gluing of the layers took place at the pressure of 0.4 bar, at a temperature of 120° C. and over a time of 45 minutes.

The temperature has been chosen so as to permit curing of the film of polyethylene and modified maleic anhydride and those of the second outer layer and the intermediate layer. At such temperature, also the modified epoxy resin of the first outer layer reacts and cures, thereby achieving a polymerization degree equal to 87%, thus permitting the gluing between the first outer layer and the intermediate layer.

Furthermore, in correspondence of the edges of the panel (that is that the panel edges in the thickness direction) a co-polymerization of the polyethylene and modified maleic anhydride film took place with the modified epoxy resin, with subsequent creation of copolymer having excellent gluing properties on both outer layers.

The temperature and the gluing time have been chosen by taking into account the degradation to which the Dyneema fibers contained in the second outer layer run into. In fact, at temperatures higher than 120° C., the Dyneema fibers start to soften.

However, it is observed that the degradation of the mechanical properties of the Dyneema fibers can be neglected when the latter are subject to a temperature of 120° C. for times not exceeding 45 minutes.

The panel obtained by means of the manufacturing process exemplified above has the mechanical properties provided in the following.

In case of bending moment that tends to bend the panel on the second outer layer 4, the bending stiffness per unit length of the panel, experimentally measured, lies in the range 0.1-0.2 N·m$^2$/m. Such bending stiffness tends to increase as the curvature radius of the panel decreases. It is thus possible to bend the panel by reaching curvature radius of approximately 3 cm without damaging the panel and the parts thereof.

In the event of a bending moment that tends to bend the panel on the first outer layer 2, the bending stiffness per unit length of the panel lies instead in the range 80-110 N·m$^2$/m, thus resulting up to over three orders of magnitudes higher with respect to the previous case.

The density of the panel is approximately equal to 760 g/m$^2$. When the panel is subject to traction parallel to the planes thereof, in one of the directions along which the fibers of the outer layers are arranged, failure occurs under a load of approximately 125 kN/m.

Example 2

A further manufacturing example of the panel according to the present invention is characterized by the use, as material for the layer 3, of foam with "grid-scored" carving.

The layer 3 is made of PET foam having a 5 mm thickness and a density of 130 kg/m³, compression elastic modulus (or macroscopic compression modulus) equal to 60 MPa according to ASTM C365/C365M standard, and shear modulus equal to 30 MPa according to ASTM C273/C273M standard. Such foam has been scored by creating squares having a size of 1 cm×1 cm over the entire surface to increase the flexibility thereof.

The second outer layer 4 is made up of a 0°/90° laminate of carbon fibers and Dyneema having a matrix and protective outer layers (layers 42, 42) made of modified polyamide having a thickness of 0.08 mm and maximum tensile strength in one of the directions of the fibers equal to 0.6 GPa in accordance with ASTM D3039/D3039M standard.

The thickness of the layer 4 has been chosen so as to satisfy at least one of the following conditions, so that the instability phenomena of the layer 4 occur under a compression load lower than failure load.

$$t_4 < 1/f_s \cdot 9/4 \cdot (\sigma_{c,4,x})^2 \cdot (t_3/(E_{c,4,x} \cdot E_{3,z}))$$

$$t_4 < 1/f_x \cdot \lambda_x \cdot (15 \cdot \sigma_{c,4,x})^{0.5}/(E_{c,4,x}^{0.5} \cdot \pi)$$

wherein
x=direction along which the fibers of the layer 4 are arranged
$t_4$=thickness of the layer 4
$t_3$=thickness of the layer 3
$\sigma_{c,4,x}$=compression failure stress of the layer 4, in accordance with ASTM D3410/D3410M standard, in the x direction
$E_{c,4,x}$=elastic compression module of the layer 4 in accordance with ASTM D3410/D3410M standard in the x direction
$E_{3,z}$=elasticity module of the layer 3 in accordance with ASTM C365/C365M standard, in the thickness direction
$\lambda_x$=distance in the direction x, measured with the panel in a resting shape, over which the layer 4, and/or the lining 42 at the interface with the layer 3, is not glued to the foam (for example in correspondence of scorings in the surface thereof)
$f_s$=safety factor, preferably higher or equal to 2

The first outer layer 2 is made up of pre-impregnated fabric made of modified epoxy resin and E9 glass fibers with 0°/90° arrangement, has a thickness of 0.25 mm and maximum compression strength in one of the directions of the fibers equal to 0.25 GPa in accordance with ASTM D3410/D3410M standard.

The thickness of the first layer 2 has been chosen so as to satisfy at least one, or preferably both, the following relationships, such that it will be the layer 4, instead of the layer 2, that fails in the event that the panel 1 be subject to a bending moment M2 that exceeds the bending failure load thereof.

$$t_2 > (1/3) \cdot t_4 \cdot \sigma_{max,4,x}/\sigma_{c,2,x}$$

$$t_2 > t_4 \cdot \sigma_{max,4,x}/\sigma_{c,2,x}$$

using the references already referred to above and indicating with:
$\sigma_{c,2,x}$=compression failure stress of the layer 2, in accordance with ASTM D3410/D3410M standard in the x direction
$\sigma_{max,4,x}$=traction failure stress of the layer 4, in accordance with ASTM D3039/D3039M standard, in the x direction.

The thickness of the layer 2 shall furthermore satisfy the condition $$t_2 \geq t_4 \cdot 1.5$$

It is furthermore verified that the properties of the disparate components of the sandwich 1 satisfy at least one, or preferably both the following conditions, such that the buckling of the layer 2 occurs under a bending load higher than that which results in the failure of the layer 4:

$$E_{3,z} > 1/4 \cdot t_3 \cdot (t_4 \cdot \sigma_{max,4,x})^2/(t_2^3 \cdot E_{c,2,x})$$

$$E_{3,z} > 9/4 \cdot t_3 \cdot (t_4 \cdot \sigma_{max,4,x})^2/(t_2^3 \cdot E_{c,2,x})$$

using the same references as above.

Figure 11:
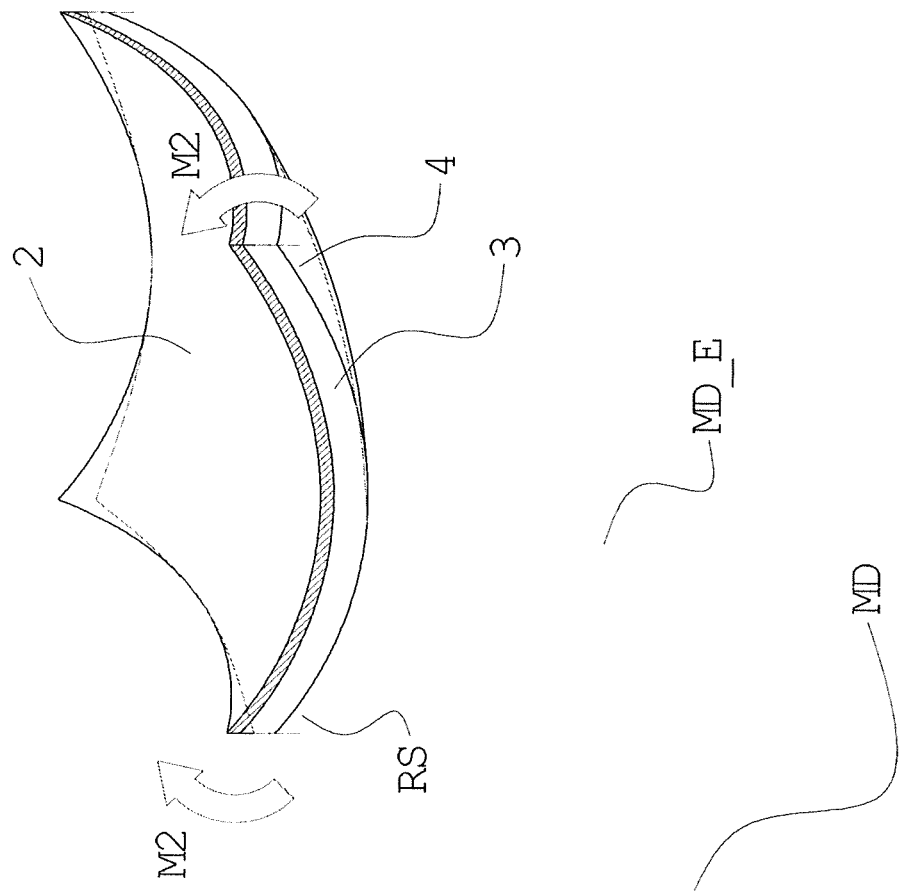
FIG. 11 shows, in axonometric view, an embodiment of the panel according to the invention subject to a bending moment and the mold used to impart thereto a resting shape during manufacturing thereof.

Curing is provided by use of a curved mold configured to confer the resting shape RS to the finished product (FIG. 11). The mold and the edges of the mold are covered with a detaching gel DF, then the second outer layer 4 is set on the gel so as not to form wrinkles; on all the exposed surface of the layer 4 (meaning by this the surface that remains exposed after setting into the mold) a polymer film having a modified PET basis exhibits good gluing capabilities on the polyamide matrix of the layer 4 and on the PET foam of the layer 3. The layer 3 is thus cut so as to result slightly less extended than the first and the second outer layers, and so as to permit to the outer layers 2, 4 to come into direct contact with one another at the edges of the mold. Thus, the foam that constitutes the layer 3 is positioned in the mold such that the shaped surface faces the second outer layer 4, and that the directions of the edges of the shaped cells results parallel to that of the fibers of the second outer layer 4 and of the first outer layer 2.

Subsequently the first outer layer 2 is positioned above the foam of the layer 3 and the edges thereof are set into contact with those of the layer 4 such that at the interface thereof a copolymer is formed during curing.

On the layer 4 a detaching film is positioned and, above that, the transpiring fabric. Last, the vacuum bag VB is positioned on top of all, hermetically sealed at the edges MD_E of the mold MD by means of the mastic SL.

The overall is inserted into the autoclave; the vacuum pump is connected to the vacuum bag VB and the autoclave is activated so that a pressure of 0.3 MPa is established therein.

Polymerization and gluing occur at a temperature of 110° C. for 60 minutes; temperature and time are chosen on the basis of the features of the polymer film and of the epoxy resin of the pre-impregnated fabric.

At the end of the process, the sandwich 1 is brought back to room temperature, then the vacuum bag VB and the transpiring fabric PF are removed and the sandwich 1 is extracted from the mold MD.

The properties of the sandwich 1 obtained by means of the manufacturing process described above are tested by manufacturing on a flat mold, and using the same material and the same manufacturing process, five short specimens having dimensions 40 mm×250 mm and thickness equal to that of the sandwich and five long specimens having dimensions of 40 mm×450 mm and thickness equal to that of the sandwich.

All the specimens exhibit the major length oriented along the direction of the maximum elasticity module of the thin skin (layer 4). Before subjecting the specimens to mechanical tests, the latter are bent a first time towards the thin skin (layer 4), until reaching a curvature radius of 5 cm; in this way the filler (layer 3) undergoes permanent deformation that facilitates the subsequent bending of the material without relevantly jeopardizing the overall mechanical performances thereof.

The specimens are those tested in accordance with ASTM D7250/D7250M standard by using the load configurations "One 4-Point Quarter-Span Loading Configuration" and "One 4-Point Third-Span Loading Configuration".

The distance between the two fixed supports in the first of the two tests is equal to 400 mm, while in the second test it is equal to 200 mm. The tests are performed at a temperature of 20° C., atmospheric pressure and relative humidity of 25%. Earlier experiments have shown that a variation in temperature of +/−4%, or of humidity or pressure of +/−30% do not influence significantly the results of the test.

Figure 14:
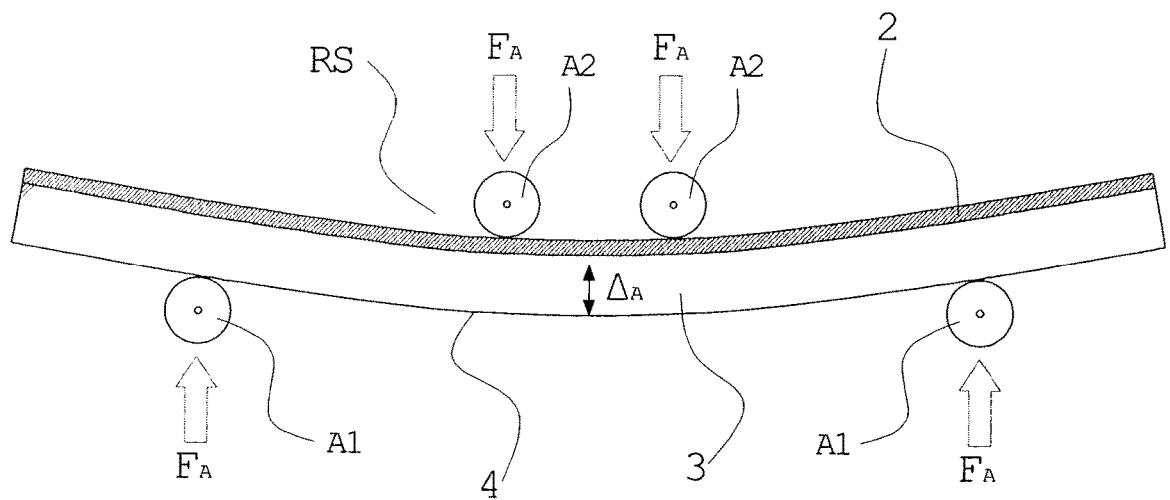

Each specimen is first tested as shown in FIG. 14, with the second outer layer 4 oriented towards fixed supports B1. This test ends with the achievement of a bending deformation of the midpoint of the specimen $\Delta_B$ equal to 4 cm (load applied by means of pushers B2).

The data so detected allowed to calculate according to ASTM D7250/D7250M procedure, the average value of bending stiffness, equal to 250 Nmm².

Subsequently each specimen is tested as shown in FIG. 14, with the first outer layer facing fixed supports A1. In this test the sandwich is brought to failure (load applied by means of pushers A2). The data so detected allowed to calculate, according to ASTM D7250/D7250M standard, the average value of bending stiffness, equal to 19140 Nmm². The panel according to the invention exhibits multiple advantages. The particular structure of the panel allows, as already shown, bending thereof on only one of its sides. Furthermore, by suitably tweaking stiffness and material, it is possible to set limits to the curvature of the panel within which the panel bends without running into failure problems.

The bending properties of the panel subject of the present invention may turn out to be particularly useful in the aerodynamic and fluid dynamic field. The panel is in fact capable of varying the shape thereof under the action of external forces and this advantageously, may yield a reduction of the action exerted by such forces on the panel itself, thereby avoiding stresses that otherwise would cause failures in the panel. This behaviour may for example occur in the event that the panel be subject to the action of a strong wind, such as to make the panel bend. As a consequence of bending, the surface of the panel that is exposed to wind is reduced, so that the action of the same on the panel is reduced accordingly.

The panel according to the present invention may be employed in multiple fields of technology, some of which are set forth in the following purely by way of example.

The panel may be used in aeronautic field, in case it is necessary to have a flexible material that allows to change the aerodynamic shapes. In such cases one may for example envisage that the panel be bent by applying suitable forces by means of tie-roads, cords, pistons or other mechanisms.

The panel may be used in the field of wind and hydraulic energy generation, to manufacture blades capable of deforming so as to decrease or increase the aerodynamic drag or lift according to the needs. For example, in the wind turbines of the Savonius type it is possible to deform the blade that moves upwind to reduce aerodynamic drag, thus increasing efficiency of the turbines.

In the field of safety suits, for example in motor cycling, the panel may be used to create joints capable of resisting to shocks or rashes. Additionally, the panel may serve to limit possible movements capable of dislocating or damaging articulation or tendons of users that wears such suits.

The panel may also be used in the field of interior design or camping equipment to create transformable or foldable items or furnishings and characterized by remarkable lightness, for example foldable chairs.

A further application is possible in the hobby/toy field, for the creation of costumes and armatures with an excellent bending capability, as well as excellent lightness and resistance capability.

The panel may also be used in the medical and rehabilitation field, for example in case it is necessary to have a very light material, resistant and flexible in a single direction. For example, the panel may be used to manufacture tutors for the rehabilitation of knees and arms, with the aim of limiting the rotation of the articulations.

A further use of the panel is possible in nautical and sport field, for the production of sails, kites, foldable hulls, crafts and the components therefor, which require excellent performances in terms of tensile resistance and lightness; furthermore in the field of winter sports, the panel may be used for the manufacturing of foldable and light equipment (for example bobsleighs, luges and so on).

Last, in the construction field, the panel may be used to set up emergency structures or forming structures for concrete casting. Furthermore it can also be envisage to use cords to modify the shape of said structures, thereby achieving the geometry and the shape that is desired most.

Of course, the details of construction and the embodiments may be widely varied with respect to what described and shown herein without by this being out of the scope of protection of the present invention, as defined by the appended claims.

The invention claimed is:

1. A panel having a layered structure comprising:
   a first outer layer,
   an intermediate layer, and
   a second outer layer; wherein
   the second outer layer has a buckling stress lower than a buckling stress of the first outer layer,
   the first outer layer and the second outer layer have each a compression failure stress higher than the buckling stress of the second outer layer, and
   the panel has a first bending stiffness when the panel is bent towards the second outer layer and a second bending stiffness when the panel is bent towards the first outer layer, the first bending stiffness is at least two orders of magnitude lower than the second bending stiffness when the panel is bent toward the second outer layer at the same intensity as when the panel is bent toward the first outer layer.

2. The panel according to claim 1, wherein said first outer layer has a thickness greater than a thickness of said second outer layer.

3. The panel according to claim 1, wherein said first outer layer and second outer layer are made up of fiber-reinforced materials having a polymer matrix, and wherein said intermediate layer is made of a filler material macroscopically compressible at least in a longitudinal direction with respect to the panel.

4. The panel according to claim 3, wherein the second layer is lined on one or both sides by means of corresponding lining layers, wherein each lining layer has an elastic modulus lower than the elastic tensile modulus of the reinforcement fibers of the second outer layer.

5. The panel according to claim 3, wherein the second outer layer is reinforced by means of continuous fibers having an elastic tensile modulus higher than 10 GPa.

6. The panel according to claim 1, wherein the intermediate layer is made up of a material having a honeycomb structure, or a polymer foam.

7. The panel according to claim 1, comprising at least one polymer film interposed between the first outer layer and the intermediate layer and/or between the second outer layer and the intermediate layer, said at least one polymer film being configured to allow the adhesion of the layers it is interposed between.

8. The panel according to claim 7, wherein the second layer is lined on one or both sides by means of corresponding lining layers, wherein each lining layer has an elastic modulus lower than the elastic tensile modulus of the reinforcement fibers of the second outer layer.

9. The panel according to claim 1, wherein said first outer layer and said second outer layer are layers resistant to traction with an elastic tensile modulus at least equal to 1 GPa.

10. The panel according to claim 1, wherein the intermediate layer has a macroscopic compressibility modulus in a longitudinal direction that is at least by two orders or magnitude lower than the elastic compression modulus of the first outer layer.

11. The panel according to claim 1, wherein, $\sigma_{b/c,2,x} \cdot t_2 > (1/3) \cdot \sigma_{max,4,x} \cdot t_4$, in which:

$\sigma_{b/c,2,x}$ is the buckling stress of said first outer layer, or the compression failure stress where the latter is lower than the buckling stress, in at least one direction x parallel to fibers of the second outer layer, $t_2$ is the thickness of the first outer layer, $\sigma_{max,4,x}$ is the tensile failure stress of the second outer layer, in the direction x, and $t_4$ is the thickness of the second outer layer.

12. The panel according to claim 1, wherein in at least one direction of the panel, the product between elastic compression modulus of the first outer layer, and the thickness of the first outer layer is higher than the product between the elastic tensile modulus of the second outer layer, and the thickness of the second outer layer.

13. The panel according to claim 1, wherein said intermediate layer has a thickness being at least five times higher than that of the second outer layer.

14. The panel according to claim 1, wherein, when the panel is bent towards the second outer layer, tension is applied to fibers of the first outer layer and fibers of the second outer layer are compressed; and when the panel is bent towards the first outer layer, tension is applied to the fibers of the second outer layer and the fibers of the first outer layer are compressed.

* * * * *